United States Patent
Sundstrom et al.

[11] 3,775,079
[45] Nov. 27, 1973

[54] METHOD FOR SIMULTANEOUSLY FORMING RIM AND PARISON

[75] Inventors: Roy N. Sundstrom, Corning; William R. Wisner, Big Flats, both of N.Y.

[73] Assignee: Corning Glass Works, Corning, N.Y.

[22] Filed: Dec. 15, 1970

[21] Appl. No.: 98,270

Related U.S. Application Data

[62] Division of Ser. No. 813,534, April 4, 1969, Pat. No. 3,598,560.

[52] U.S. Cl. .................................. 65/79, 65/184
[51] Int. Cl. ............................................ C03b 9/14
[58] Field of Search ............. 65/184, 229, 231, 65/235, 79, 239, 265

[56] References Cited
UNITED STATES PATENTS

| 687,595 | 11/1901 | Blue | 65/229 X |
| 744,010 | 11/1903 | Proeger | 65/231 |
| 1,393,118 | 10/1921 | Hall | 65/231 |
| 1,875,202 | 8/1932 | Aftergut | 65/235 X |
| 1,943,195 | 11/1934 | Vanness | 65/184 |
| 2,280,268 | 4/1942 | Schutz | 65/184 X |
| 2,729,916 | 1/1956 | Casler et al. | 65/184 X |
| 2,826,867 | 3/1958 | Nava, Jr. et al. | 65/229 |
| 3,434,820 | 3/1969 | Zappia et al. | 65/229 X |
| 3,647,410 | 3/1972 | Heaton et al. | 65/184 X |
| 1,834,384 | 12/1931 | Cramer | 65/235 |

Primary Examiner—Frank W. Miga
Attorney—Clarence R. Patty, Jr.

[57] ABSTRACT

A blow-head assembly and a method of forming parisons from charges of molten glass deposited on the upper surfaces of axially separable neck ring mold assemblies and associated neck ring mold halves in an overlying relationship with the entrance to the orifices embodied in such assemblies and mold halves and extending vertically therethrough. Parison molds are disposed below the orifice of each said assembly and its associated mold halves, and said blow-head assembly comprises a combined plunger and blow-tip embodied in the bore of a hollow sleeve member and longitudinally movable therein. Forming method comprises blowing the glass charges through orifices of the neck ring molds and into conformity with such molds and parison molds therebelow, and momentarily moving said plunger downwardly into the glass in the orifices of the neck ring molds to press-form the upper rim and inner periphery of neck portion of each parison.

6 Claims, 21 Drawing Figures

INVENTORS.
Roy N. Sundstrom
William R. Wisner
BY Charles W. Gregg
AGENT

INVENTORS.
Roy N. Sundstrom
William R. Wisner
BY
Charles W. Gregg
AGENT

METHOD FOR SIMULTANEOUSLY FORMING RIM AND PARISON

This is a division of our copending U.S. Pat. application Ser. No. 813,534 filed Apr. 4, 1969 now U.S. Pat. No. 3,598,560 issued Aug. 10, 1971.

BACKGROUND OF THE INVENTION

There is disclosed in U.S. Pat. No. 1,790,397, issued Jan. 27, 1931 to W. J. Woods et al., a glass working machine in which a continuous ribbon of molten glass is deposited on the upper surfaces of a plurality of orifice plates moving in a continuous closed path of travel and in which glass articles are formed from such ribbon by permitting parts thereof to initially sag by gravity through the orifices in said plates during the movement of such plates through a first part of said path of travel and by thereafter blowing said parts of the ribbon into conformity with cavities in finishing molds which also move in a continuous closed path of travel including a part extending below the lower surfaces of said orifice plates beyond said first part of the path of travel of such plates. Such a machine provides for extremely high speed forming of glass articles such as Christmas tree decorations, or thin-walled enclosures, bulbs or envelopes for electric incondescent lamps for example but, due to somewhat uneven vertical distribution of the glass in articles so formed, the machine as disclosed in said patent has found little or no use in forming glass articles of other types such as, for example, food containers.

U.S. Pat. Nos. 2,280,167, issued Apr. 21, 1942 to L. D. Soubier, and 2,391,963, issued Jan. 1, 1963, to D. E. Gray, disclose glass forming or glass working machines which comprise modifications of the machine of the above-cited Woods et al. patent and which may be employed for manufacturing glass articles such as bottles or containers for food. However, due to the methods of parison formation employed by the machines of the Soubier and Gray patents, such machines are not satisfactory for high-speed production of bottles or food containers having relatively thin walls and, therefore, of light weight.

It is, accordingly, an object of the present invention to provide a novel type of blow-head assembly and a method employing such assembly for forming parisons on a machine such as, for example, disclosed in the aforecited Woods et al. patent, such parison formation being performed at a high rate of speed and with a glass distribution in the parisons such as to permit the adaptation of the machine of the Woods et al. patent to high speed production of relatively thin-walled glass articles such as bottles or containers for food. The method and apparatus of the present invention, when employed with a machine such as disclosed in said patent, also provides for relatively high utilization of the glass ribbon used in the formation or production of the glass articles.

It is expedient to point out at this point in the description that the invention, although described in conjunction with a machine of the type disclosed in the Woods et al. patent, is not intended for use only in conjunction with such a machine but can be readily adapted for use with other types of glass forming machines or apparatus such as, for example, the glass working apparatus disclosed in U.S. Pat. No. 2,263,126, issued Nov. 18, 1941 to D. E. Gray et al.

SUMMARY OF THE INVENTION

In practicing the invention herein disclosed, there is provided a new and improved method and apparatus for combined blow and press-forming of hollow glass parisons from charges of molten glass carried on the top surfaces of one or more orifice plates or neck ring mold assemblies in an overlying relationship with the entrance to the orifice in each such assembly, said apparatus comprising a blow-head assembly including a combined blow-tip and pressing plunger embodied in the bore of a hollow sleeve member. The sleeve member is first lowered into contact with the charge of molten glass in a surrounding relationship with the orifice underlying such charge and pressurized aeriform fluid is then supplied through the blow tip and sleeve member to blow the charge into conformity with the neck ring and a parison mold disposed therebelow. The combined blow-tip and plunger is then momentarily lowered into contact with the glass in the neck ring mold to press form the inner periphery of the neck portion of the parison and a seamless upper rim on such portion.

BRIEF DESCRIPTION OF THE DRAWINGS

Similar reference characters refer to similar parts in each of the FIGS. of the drawings.

PREFERRED EMBODIMENTS OF THE INVENTION

Figures 1, 2:
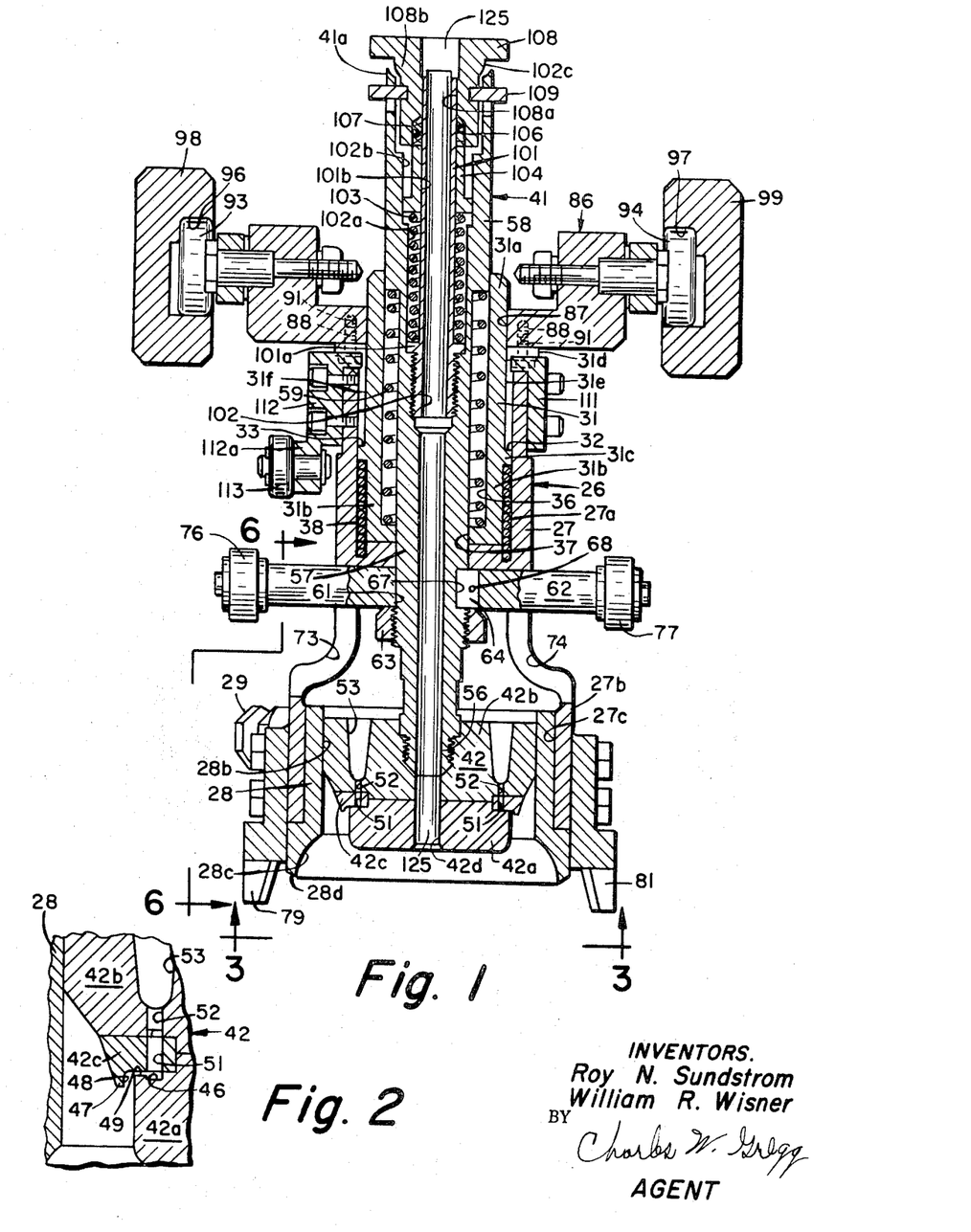
FIG. 1 is a cross-sectional elevational view of the blow-head assembly embodying the invention.
FIG. 2 is an enlarged view of part of the assembly of FIG. 1 and illustrating a detail of such assembly.
Figures 3, 4, 5, 6, 7, 8, 9, 10:
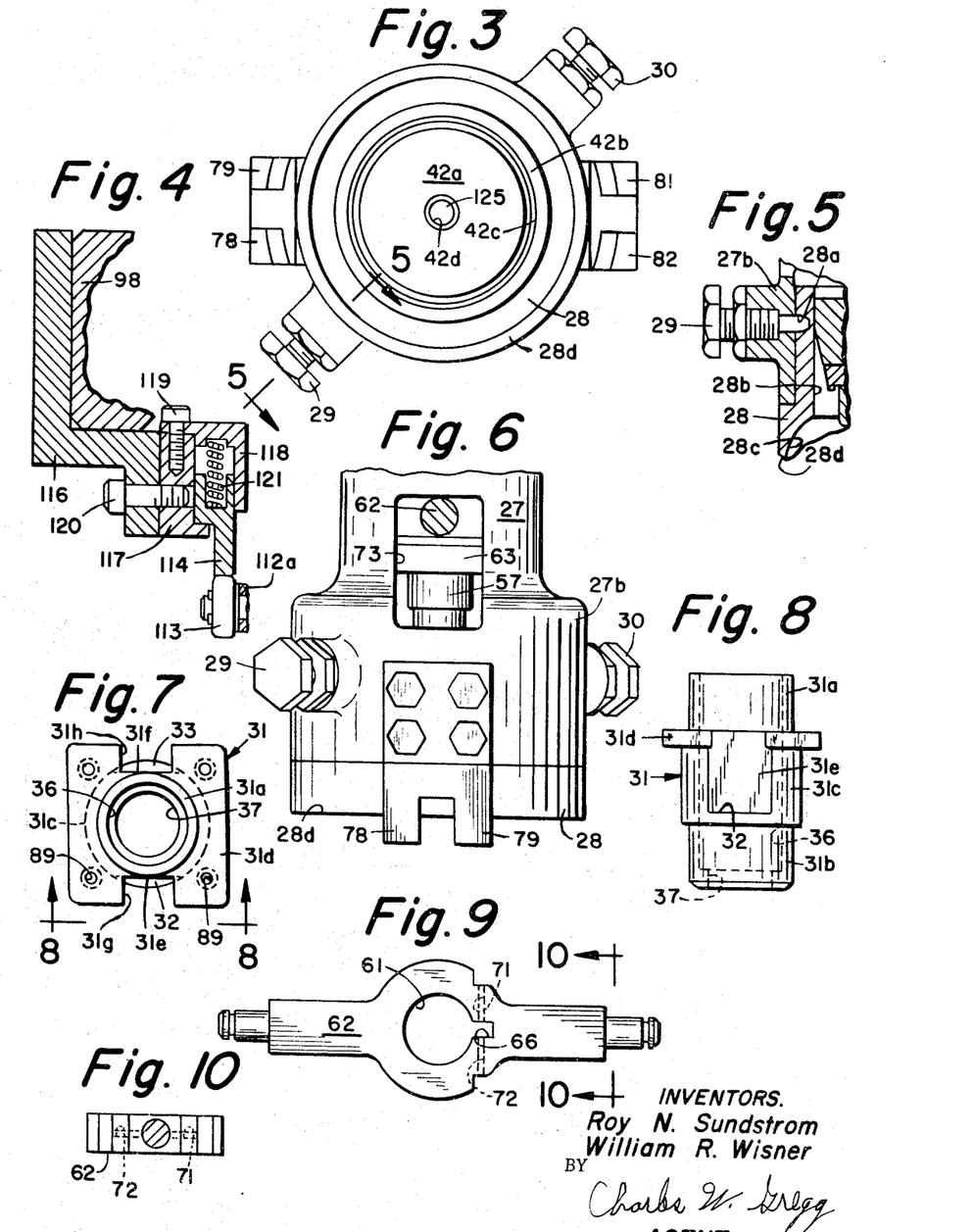
FIG. 3 is a bottom view of the apparatus of FIG. 1, such view being taken generally along line 3—3 of FIG. 1.
FIG. 4 is a cross-sectional view illustrating an apparatus arrangement for actuating part of the apparatus of FIG. 1.
FIG. 5 is a cross-sectional view of a detail of the apparatus of FIG. 1, such view being taken generally along line 5—5 of FIG. 3.
FIG. 6 is an elevational view of part of the apparatus of FIG. 1, such view being taken generally along line 6—6 of FIG. 1.
FIG. 7 is a top plan view of one of the parts of the apparatus of FIG. 1.
FIG. 8 is an elevational view of the part of the apparatus shown in FIG. 7, such view being taken along line 8—8 of FIG. 7.
FIG. 9 is a detailed top plan view of another part of the apparatus of FIG. 1.
FIG. 10 is an end view of the part of the apparatus illustrated in FIG. 9, such view being taken along line 10—10 of FIG. 9.

Referring to the drawings in detail, there is shown in FIG. 1 a blow-head assembly 26 comprising a first hollow sleeve member 27 embodying a circular bore 27a extending therethrough. The lower portion 27b of sleeve member 27, and the portion of bore 27a in such lower portion, flare outwardly to provide a chamber 27c in which is disposed a second hollow sleeve member 28 embodying a circular bore 28b. Such second sleeve member 28 is secured in said chamber 27c by a pair of screws such as 29 and 30 (FIGS. 1, 3, 5 and 6) the ends of such screws, as illustrated in FIG. 5, extending into holes such as 28a provided in the second sleeve member 28 and such member thereby forming an integral part of sleeve member 27 when so secured therein. The lower end 28c of bore 28b in sleeve member 28 flares outwardly to provide a narrow and slightly downwardly tapered annular rim 28d on the bottom of the sleeve member.

A third hollow sleeve member 31 (FIGS. 1, 7 and 8) is disposed in the upper portion of bore 27a of sleeve member 27. As best illustrated in FIGS. 7 and 8, sleeve member 31 comprises upper and lower portions 31a and 31b, respectively, of generally equal diameters, a center portion 31c of a somewhat larger diameter than portions 31a and 31b, and a generally square flange portion 31d located between portions 31a and 31c of the sleeve member. Center portion 31c of member 31 is of a generally circular cross-sectional configuration having a peripheral diameter corresponding to the diameter of upper portion 27a of sleeve member 27. However, such center portion 31c is provided on its outer periphery with two flat areas such as 31e and 31f which generally coincide with a pair of recesses 31g and 31h, respectively, provided in said flange portion 31d of member 31. The provision of the flat areas 31e and 31f on the outer periphery of center portion 31c of sleeve member 31 also provides ledges 32 and 33, respectively, which, as hereinafter further discussed, act as stops for sleeve member 31.

Sleeve member 31 includes a first bore 36 which extends through almost the full length of the member and a second bore 37 of a smaller diameter than bore 36 and which extends only through the bottom of lower portion 31b of member 31. A first compressible coil spring 38 surrounds lower portion 31b of sleeve member 31 and the upper end of such spring bears against the lower rim of center portion 31c of member 31 while the lower end of such spring bears against the bottom of lower portion 31b of member 31 (FIG. 1). Spring 38 will be further discussed hereinafter.

A combined plunger and blow-tip comprising a hollow tubular member 41 and a composite plunger-head 42 are provided within the bores of sleeve members 27, 28 and 31 (FIG. 1). Plunger head 42 is formed of three parts which are integral with each other. Such parts are a lower glass forming part 42a, an upper support and guide part 42b, and an annular part 42c disposed between said lower and upper parts 42a and 42b (FIGS. 1 and 3). As illustrated in the enlarged detail view of FIG. 2, part 42a of plunger head 42 includes adjacent its upper end a recessed portion including an annular channel 46 which extends around the upper end of part 42a. Annular part 42c includes a lower annular rim portion 47 extending downwardly from the main body of such part 42c and spaced from the outer periphery of the upper end of part 42a. This arrangement provides an annular channel 48 which surrounds said outer periphery of the upper end of part 42a. The upper part of annular channel 48 connects to channel 46 in lower part 42a of plunger head 42 through an annular space 49 of a few thousandths of an inch in height and provided between the lower surface of annular part 42c and the outer part of the upper surface of said recessed portion in the upper end of part 42a. One or more passages such as 51 (FIGS. 1 and 2) extend through annular part 42c of plunger head 42 and connect with one or more passages such as 52 extending through upper part 42b of the plunger head and connecting with a relatively deep annular channel 53 provided in the upper end of said upper part 42b. As hereinafter further discussed, annular channel 48 provided in plunger head 42 is provided to form a seamless upper rim on the parisons formed by the blow-head assembly of the invention during a parison forming operation. Channel 46, annular space 49, and passages such as 51 and 52 provide an escape route for any air entrapped in channel 48 when said seamless upper rim is being formed during a parison forming operation.

As illustrated in FIG. 1, hollow tubular member 41 of the combined plunger and blow tip includes a first lower externally threaded portion 56 which is screwed into cooperating threads provided in part 42b of plunger head 42, an intermediate portion 57 which has an outer diameter corresponding to the previously mentioned second bore 37 extending through the bottom of lower portion 31b of sleeve member 31, and an upper portion 58 having a somewhat larger outer diameter than said intermediate portion 57. The lower end of portion 58 of tubular member 41 extends snugly but slidably into the previously mentioned larger bore 36 of the third sleeve member 31 and a second compressible coil spring 59 surrounds the intermediate portion 57 of tubular member 41. The upper end of spring 59 bears against the lower end of said upper portion 58 of tubular member 41 and the lower end of such spring bears against the bottom of said sleeve member 31. Spring 59 thus normally resiliently biases tubular member 41 upwardly within the bores of sleeve members 31 and 37 while plunger head 42 is similarly biased upward within the bore 28c of second sleeve member 28. This will be readily apparent to those skilled in the art.

The lower end of intermediate portion 57 of tubular member 41 extends through a hole 61 embodied in the main body portion of a yoke-shaped member 62 employed for actuating the combined plunger and blow tip as hereinafter discussed. Intermediate portion 57 of tubular member 41 is threaded adjacent the lower end of such portion and a suitable nut 63 is screwed onto such threads to hold member 62 upwardly on said portion 57 of member 41. A key 64 (FIG. 1) is located in suitable slots 66 and 67 provided in member 62 and portion 57 of member 41, respectively, to prevent rotation of member 62 on such portion of member 41. A pin 68 extends through holes 71 and 72 in member 62 and through a corresponding hole provided in key 64 to, at times, prevent vertical movement of yoke-shaped actuating member 62 along the outer periphery of intermediate portion 57 of tubular member 41.

The oppositely extending arms of yoke-shaped actuating member 62 extend through openings 73 and 74 (FIGS. 1 and 6) embodied in first sleeve member 27.

When the blow head assembly 26 is employed, for example, on a machine such as that disclosed in the aforecited patent to W. J. Woods et al., the ends of member 62 are, as illustrated in FIG. 1, provided with rollers such as 76 and 77 which are freely rotatable on the ends of member 62, and a pair of rails are provided on the machine of the Woods patent for contacting such rollers and actuating the blow head assembly 26, as hereinafter further discussed.

Referring further to FIGS. 1, 3, and 6, a first pair of downwardly extending fingers 78 and 79 are secured to the outer periphery of lower portion 27b of sleeve member 27, such fingers tapering outwardly towards the lower ends thereof and the inner surfaces of the fingers having arcs of curvature coinciding with arac of a circumference of a circle having a center coinciding with the central axis of sleeve member 27. A second pair of downwardly extending fingers 81 and 82 (FIGS. 1 and 3) are also secured to the outer periphery of lower portion 27b of sleeve member 27. Such second pair of fingers are shaped similarly to said first pair of fingers 78 and 79 and are secured to said lower portion 27b of sleeve member 27 directly opposite the first pair of fingers and at a height corresponding to such first pair. The purpose of fingers 78, 79, 81 and 82 will be pointed out later in the description.

Referring further to FIG. 1, taken in conjunction with FIGS. 7 and 8, the upper portion 31a of sleeve member 31 extends through a suitable hole 87 embodied in a cross-head support member 86 (FIGS. 1 and 11) and such support member is secured to portion 31d of sleeve member 31 by screws, such as 88, which extend through holes such as 89 (FIG. 7) provided in said portion 31d of member 31 and which are screwed into cooperating threads provided in holes 91 extending upwardly into cross-head member 86. When the blow head assembly 26 is employed on a machine such as disclosed in the aforecited Woods et al. patent, as hereinafter further discussed, the ends of cross-head support member 86 are provided with freely rotatable rollers or wheels such as 93 and 94 (FIG. 1) which extend into suitable guide channels 96 and 97, respectively, provided in tracks or rails 98 and 99, respectively. Such arrangement will be further discussed hereinafter.

A relatively thin walled hollow tubular member 101 is provided with threads on the lower end thereof and such end is screwed into cooperative threads provided in a hollow or bore 102 extending longitudinal through previously discussed tubular member 41, such threads being provided in the part of hollow or bore 102 which extends through the upper part of center portion 57 of tubular member 41. A portion 102a of bore 102 above said threads in such bore has a larger diameter than the lower portion of said bore and an annular flange 101a, provided on tubular member 101 above said threads on the lower end of such member, extends into portion 102a of bore 102. A compressible spring 103 surrounds tubular member 101 above flange 101a and the lower end of such spring bears against the top surface of such flange.

Another sleeve 104 surrounds the outer periphery of tubular member 101 above spring 103 and the top end of such spring bears against the bottom surface of a flange provided on the lower end of sleeve 104. Such flange fits snugly and slidably in another portion 102b of bore 102 of tubular member 41, such other bore portion having a diameter larger than said portion 102a of bore 102. The upper end of sleeve 104 bears against a packing material 106 provided in an annular chamber 107 in the lower end of a top member 108 which embodies a center bore 108a. Chamber 107 surrounds tubular member 101 near the upper end thereof. The upper end of tubular member 101 extends snugly and slidably through hollow or bore 108a provided in top member 108 above said chamber 107 in such member. Referring to FIG. 1, it will be noted that the bottom of the packing material 106 in chamber 107 of member 108 rests on the top rim of sleeve 104 and such sleeve is of a length or height such that an upper flared portion of top member 108 is supported by said packing material so that it is out of contact with the rim 41a of the extreme upper end of tubular member 104. By the arrangement shown, downward movement of top member 108 will cause seating of the lower curved surface of a flared upper portion 108b of top member 108 in a complementally curved and flared portion 102c of bore 102b in the upper end of tubular member 41 below rim 41a of such member. Such seating of portion 108b of member 108 in portion 102c of bore 102b in member 41 will cause the upper rim of sleeve 104 to intrude into chamber 107 in member 108 and compress packing material 106 in chamber 107 into tight contact with the part of the outer periphery of member 101 extending through such chamber. As hereinafter further discussed, such operation will provide, to the extent possible, a hermetic or air-tight seal surrounding said part of the outer periphery of tubular member 101.

It is pointed out that a horseshoe of U-shaped clip 109 partially surrounds top member 108 below portion 108b of such member, and extends through suitable slots in the upper end of tubular member 41 and into suitable grooves or channels provided in the outer periphery of member 108. Such clip 109 keys member 108 to the upper end of member 41 while permitting a somewhat floating movement of member 108. Clips such as 109 are well known and the arrangement just described will be readily apparent to those skilled in the art.

An inverted L-shaped stop member 111 is secured to the outer periphery of the upper portion of sleeve member 27 and the upper horizontally extending portion of such stop member extends into recess 31g of portion 31d of sleeve member 31. Said horizontally extending portion of stop member 111 will be contacted by the previously mentioned ledge 32 on member 31 if such member is actuated to a sufficient distance upwardly in bore 27a of sleeve member 27. Stop member 111 thus limits the upward actuation of member 31 in said bore 27a.

A second stop member 112 is provided on the outer periphery of sleeve member 72 opposite stop member 111 and an upper part thereof extends into recess 31h in portion 31d of sleeve member 31 in a manner similar to that just described in conjunction with stop member 111. Said upper part of member 111 cooperates with ledge 33 on sleeve member 31 to also limit the upper actuation of member 31 in bore 27a of sleeve member 27. Second stop member 112 is shown as including a downwardly extending portion 112a. When the blowhead assembly 26 of the present invention is employed on a machine such as disclosed in the previously mentioned Woods et al. patent, a freely rotatable roller 113 is carried on the downwardly extending portion 112a of stop member 112 (FIGS. 1 and 4) and such roller is, as hereinafter further discussed, at times contacted by a pendant rail or track 114 (FIG. 4) which is supported by a bracket 116 which is, in turn, secured to previously mentioned track or rail 98 in any convenient manner. Associated supports 117 and 118 are secured to each other by bolts, such as 119, and are fastened to bracket 116 by bolts such as 120. A compressible coil spring 121 resiliently biases rail or track 114 in a downward direction as illustrated in FIG. 4.

The previously discussed plunger head 42 embodies a passage 42d which extends vertically through the center of the plunger head and connects with the lower end of the bore 102 of tubular member 41. Such bore 102 connects, in turn, with bore 101b of tubular member 101, and bore 101b connects with bore 108a in top member 108. Thus, a pressurized fluid or compressed air passage, designated 125 and extending vertically and completely through blow-head assembly 26, along the center axis thereof, is provided by said bores and passages 42d, 102, 101b, and 108a. This will be readily apparent from a brief glance at FIGS. 1 and 3 of the drawings.

Figure 11:
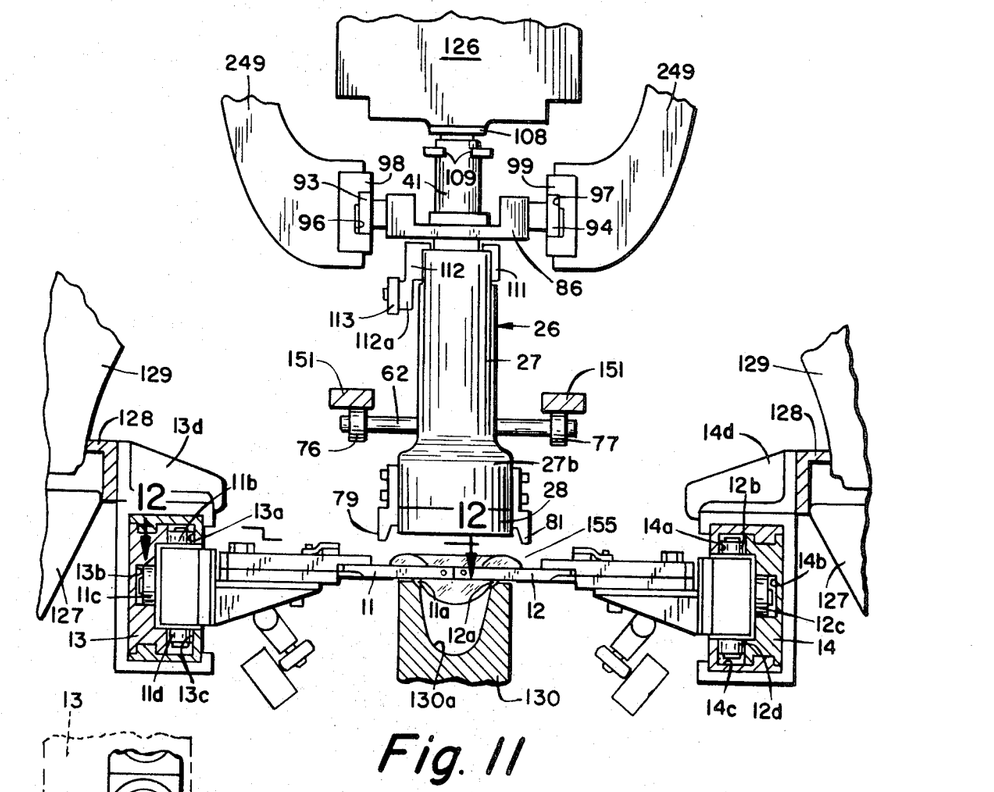
FIG. 11 is a schematic elevational view of the apparatus of FIG. 1 illustrating the mounting of such apparatus on one type of machine of known construction.

Referring to FIG. 11, blow-head assembly 26 is illustrated as being supported by a pair of brackets, such as 249, to which the previously mentioned tracks or rails 98 and 99 (FIG. 1) are secured in any convenient manner. Rollers or wheels 93 and 94 carried on cross-head support 86 of assembly 26 ride in guide channels 96 and 97, respectively, as previously discussed. A blowbox 126 is shown above top member 108 of assembly 26. Brackets 249, rails 98 and 99, and blowbox 126 form, per se, no part of the present invention but such members are similar to brackets 249, rails 205 and 206, and blowbox 201, respectively, shown in FIG. 3A of the aforesaid patent to W. J. Woods et al. FIG. 11 illustrates, therefore, the manner in which blow-head assembly 26 may be employed on a machine such as covered by the patent to Woods et al.

Figure 12:
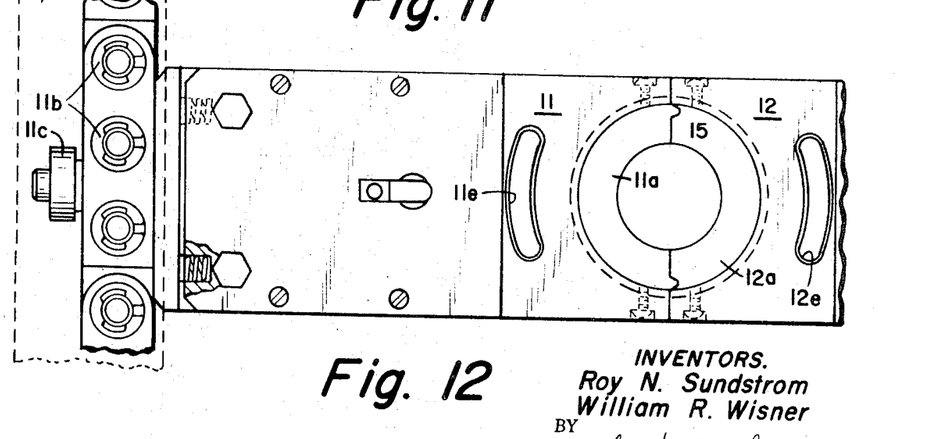
FIG. 12 is a top plan view of part of the apparatus of FIG. 11, such view being taken generally along line 12—12 of FIG. 11.

Referring further to FIG. 11, blow-head assembly 26 is shown as being supported above a pair of axially separable neck ring mold assemblies 11 and 12 including cooperative neck ring mold halves 11a and 12a (FIG. 12). Neck ring mold assembly 11 is shown supported by a track or rail assembly 13 including guide channels such as 13a, 13b, and 13c in which rollers or wheels such as 11b, 11c, and 11d of assembly 11 are respectively disposed. Similarly neck ring mold assembly 12 is illustrated as supported by a track or rail assembly 14 disposed opposite assembly 13 and including guide channels such as 14a, 14b and 14c in which rollers or wheels such as 12b, 12c, and 12d, of assembly 12 are respectively disposed. Assemblies 13 and 14 are also illustrated as including brackets 13d and 14d, respectively, which are shown attached to horizontal tie bars 128 which are, in turn, secured to a yoke 129 whose opposite ends are supported on the tops of standards such as 127. The members such as 127, 128 and 129 form, per se, no part of the present invention but such members correspond, respectively to tie bars 59, yoke 60 and standards 57 shown in said FIG. 3A of the aforesaid patent to Woods et al.

It is expedient to point out at this point in the specification that neck ring mold assemblies 11 and 12 shown in FIGS. 11 and 12 of the drawings also do not, per se, form a part of the present invention but are the subject matter of a separate patent application of Mijo A. Gossie, Roy N. Sundstrom, William R. Wisner and Edward J. Zak bearing U.S. Pat. Ser. No. 813,664 filed Apr. 4, 1969, now U.S. Pat. No. 3,597,186 issued Aug. 3, 1971, such application being filed on even date with the present application and being assigned to the same assignors as the present application.

Referring further to FIGS. 11 and 12, blow head assembly 26 is shown as axially aligned with a circular orifice 15 formed by the complemental and cooperative neck ring mold halves 11a and 12a positioned in engagement with each other as shown in FIG. 12. There is provided in neck ring mold assemblies 11 and 12 arcuate channels 11e and 12e, respectively (FIG. 12) whose arcs of curvature correspond to the previously described arcs of curvature of the inner surfaces of the downwardly extending pairs of fingers 78 and 79, and 81 and 82, respectively (FIGS. 1, 3, 6 and 11). The purpose of arcuate channels 11e and 12e will become apparent hereinafter in an operational example of the invention.

A parison mold 130 is illustrated in FIG. 11 as being disposed below neck ring mold assemblies 11 and 12 with the inner perimeter of the top rim of such mold, and defining the entrance to the forming cavity 130a of the mold, disposed contiguous with and surrounding the outer surfaces of downwardly extending semicircular portions 11b and 12b of neck ring mold halves 11a and 12a, respectively, as is well known in the art.

Figure 13:
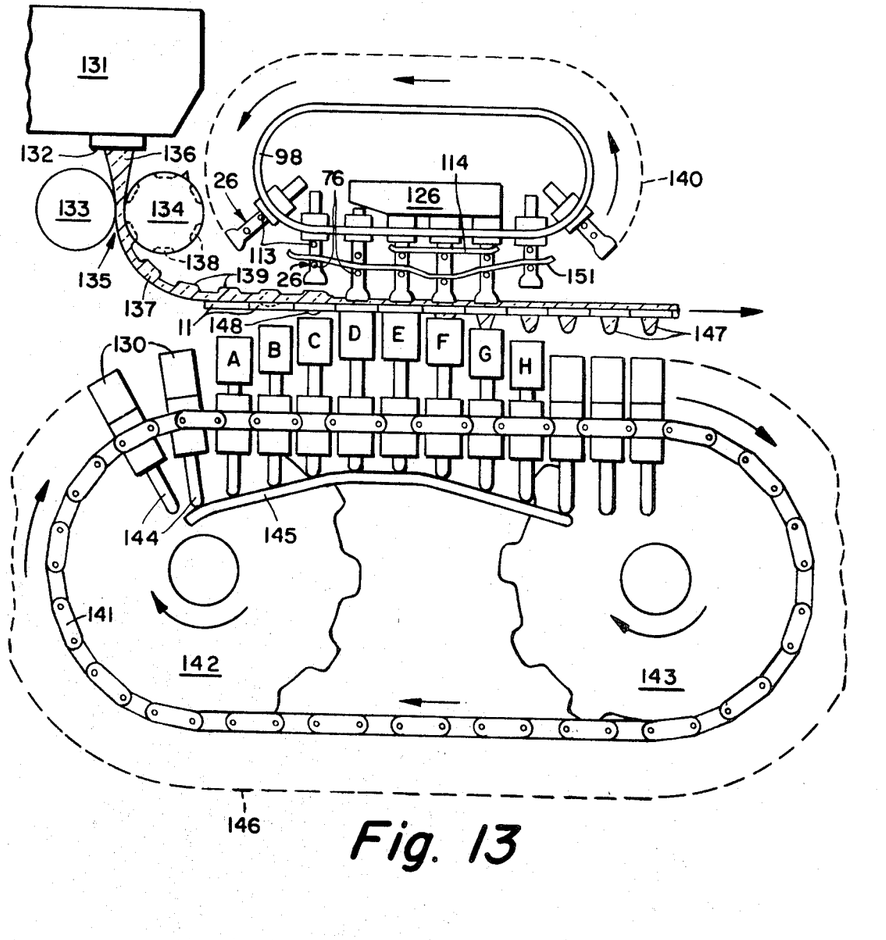
FIG. 13 is a diagrammatic view illustrating a series of blow-head assemblies of the invention when being used for forming parisons from a ribbon of molten glass in accordance with the inventive method disclosed.
Figure 14:
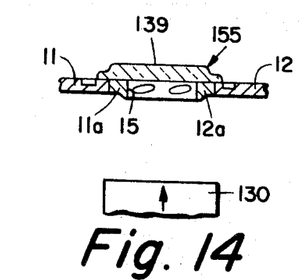
FIGS. 14 through 21 illustrate consecutive steps employed in the method of forming parisons disclosed herein.
Figure 15:
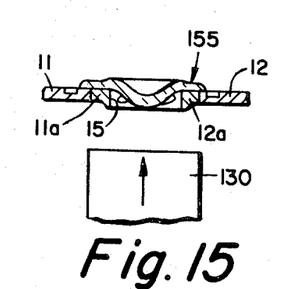
Figure 16:
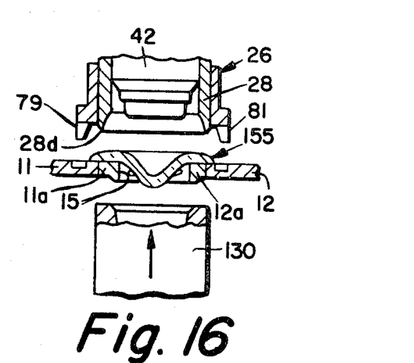
Figure 17:
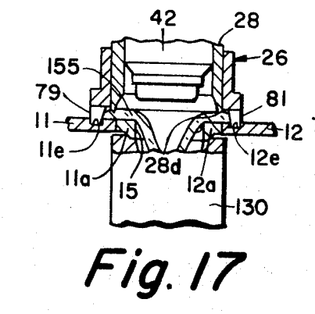

FIG. 13, as previously mentioned, diagrammatically illustrates the adaptation of a series of blow-head assemblies, such as the blow-head assembly 26 disclosed herein, to a machine such as covered by the previously cited patent to Woods et al., such series of assemblies being employed, in conjunction with a series of cooperative neck ring mold assemblies and parison molds, for forming parisons to be subsequently formed into relatively thinned-wall containers having a relatively even vertical distribution of glass in the walls of the containers.

There is shown in FIG. 13 a forehearth 131 including a molten glass issuing orifice 132, a pair of forming rolls 133 and 134 which provide a vertical glass forming pass 135 through which the glass 136 issuing from said orifice passes to be formed into a glass ribbon 137. A series of packets such as 138 provided about the outer periphery of forming roll 134 form bosses such as 139 on upper surface of glass ribbon 137. Items 131 and 132 in FIG. 13 correspond to items 51 and 52, respectively, shown in FIG. 1 of the Woods et al. patent, and rollers 133 and 134 correspond to forming rolls 71' and 72' shown, for example, in FIGS. 36, 38, 39, and 40 and 41 of said patent. Similarly, items 135 and 136 in FIG. 13 of the present application correspond, respectively, to the vertical forming pass 77 and to the molten glass 78 shown issuing from orifice 52 in FIG. 1 of said Woods et al. patent. Reference character 137 in FIG. 13 of the present application designates the molten glass ribbon designated 79' in FIGS. 42, 43, 46, and 47 of Woods et al., while reference characters 138 and 139 in FIG. 13 designate, respectively, the pockets 80 on roll 72' and the bosses 81 on glass ribbon 79' in FIGS. 38 through 41, and FIGS. 42 through 47, respectively, of said patent.

The previously mentioned series of blow-head assemblies such as 26 are illustrated in FIG. 13 as moving on rails such as 98 in a vertical and endless loop path designated 140. Each blow-head assembly such as 26 is shown in FIG. 13 as including a roller such as 76 which, in times, contacts the lower side of a rail such as 151 for actuation of the assembly as hereinafter further discussed in detail. Each said assembly also includes a roller such as 113 which, at times, contacts the lower edge of a rail such as 114 for a purpose also hereinafter discussed in an operational example of the invention. The roller such as 76 and the rail such as 98 are also shown in FIGS. 1 and 11 of the present application, while the roller such as 113 is shown in FIGS. 1, 4 and 11. The rail such as 114 is also shown in FIG. 4.

FIG. 13 also illustrates a series of neck ring mold assemblies such as 11 each of which, as illustrated in FIGS. 11 and 12, cooperate with an associated and complemental neck ring mold assembly such as 12. The neck ring mold assemblies such as 11 travel through a horizontal and endless loop path in the front of the apparatus shown in FIG. 13 while the neck ring mold assemblies such as 12 travel in a similar path in the back of said apparatus. Such arrangements are well known in the art and may be similar to those shown in FIGS. 4 and 9 of the Woods et al. patent. Such horizontal paths of travel are not illustrated in FIG. 13 for purpose of simplification of the drawings. It is pointed out, however, that associated neck ring mold assemblies 11 and 12 are disposed, as illustrated in FIG. 11, below each blow-head assembly such as 26 when such assemblies are moving through the lower part of their vertical paths of movement illustrated in FIG. 13. This will be readily understood by those skilled in the art.

Referring further to FIG. 13 taken in conjunction with FIG. 11, a series of parison molds, such as mold 130 previously discussed, are moved through a vertical and endless loop path of travel designated 146 and located below the paths of travel of the associated neck ring mold assemblies 11 and 12. The parison molds such as 130 are carried through their path of travel by an endless chain 141 which is looped about a pair of drive sprockets 142 and 143. Each of the molds such as 130 has an actuating rod 144 which at times, contacts a track or rail 145 for actuation of the respective parison mold in an upward direction and into a cooperative relationship with the neck ring mold halves carried by a pair of neck ring mold assemblies 11 and 12 as best illustrated in FIG. 11.

It is pointed out that full complements of successions of blow-head assemblies such as 26 and parison molds such as 130 are not shown in FIG. 13 for purposes of simplification of the drawings. However, it will be readily understood that the succession or series of equally spaced blow-head assemblies extends completely around the vertical path of travel 140 and that the succession or series of equally spaced parison molds extends completely around the vertical path of travel 146.

An operational example of the method and apparatus of the invention in forming a parison will now be given with reference to FIGS. 14 through 21 taken in conjunction with FIGS. 1, 4, 11, 12 and 13 discussed above.

It is first pointed out that each section of the molten glass ribbon 137 which includes a boss such as 139 (FIG. 13) is considered to be a charge 155 (FIGS. 11, and 14 through 21) of molten glass and that rolls 133 and 134 in FIG. 13 are rotatively driven in a time relationship with the driven movement of neck ring mold assemblies 11 and 12 through their previously discussed paths of travel, so that each successive glass charge such as 155 is disposed on the upper surfaces of each successive pair of associated and engaged neck ring mold assemblies with the center of the boss 139 of each respective charge 155 located approximately vertically in line with the center of orifice 15 in the neck ring molds 11a and 12a of the respective pair of neck ring mold assemblies 11 and 12. This will be apparent to those skilled in the art.

Assuming now that glass is issuing from orifice 132 of forehearth 131 and is passing through forming pass 135, provided by rolls 133 and 134, to be formed into a succession of charges, such as 155, of molten glass, and that such charges are being deposited on said associated pairs of neck ring mold assemblies 11 and 12 as discussed above. It will be further assumed that the blow-head assemblies such as 26 and the parison molds such as 30 are being driven through their said paths of movement or travel in a time relationship with the movement of the neck ring mold assemblies and ribbon 137 such that a blow-head assembly and a parison mold are disposed as illustrated in FIG. 1, above and below each said mold assembly with the central longitudinal axes of the respective blow-head assembly and of the cavity 130a in the respective parison mold in alignment with the center of orifice 15 in the respective neck ring mold halves 11a and 12a.

Referring to FIGS. 14 through 21, there is illustrated the progressive formation of a parison in accordance with the method of the invention and employing a novel blow-head assembly, such as 26 (FIGS. 1, 11 and 13) embodying the apparatus of the invention. The letters "A" through "H" on certain of the parison molds such as 130 in FIG. 13 correspond to the successive positions of a single set of associated apparatus including a blow-head assembly 26, a pair of cooperative neck ring mold assemblies 11 and 12, and a parison mold 130. As is apparent, said positions "A" through "H" correspond to the positions of the single set of apparatus as illustrated in FIGS. 14 through 21, respectively.

Referring to FIGS. 13 and 14 through 21, taken in conjunction with FIGS. 1 and 11, a glass charge 155 is deposited on the top surfaces of assemblies 11 and 12 (position "A" in FIG. 13, and FIG. 14) above orifice 15 of neck ring molds 11a and 12a while parison mold 130 is being actuated upwardly by track or rail 145 (FIG. 13). In position "B" (FIGS. 13 and 15) glass charge 155 is shown as beginning to sag through orifice 15 while parison mold 130 is moved still further upwardly. In position "C" (FIGS. 13 and 16) the glass charge has sagged still further, parison mold 130 is about to contact the bottom surfaces of neck ring molds 11a and 12a, and blow-head assembly 26 has moved into its position above neck ring mold assemblies 11 and 12 with the tracks or rails such as 151 contacting roller 76 (FIGS. 11 and 13) and roller 77 (FIG. 11).

At position "D" (FIG. 13) parison mold 130 has been moved up into contact with the neck ring mold halves 11a and 12a (FIG. 17) and blow-head assembly 26 has been actuated by the tracks or rails such as 151 so that members 27 and 28 are moved downwardly. Such downward movement of member 27 causes fingers such as 79 and 81 to enter the cooperative channels 11e and 12e, respectively, in neck ring mold assemblies 11 and 12, respectively, to lock such assemblies and neck ring mold halves 11a and 12a in their cooperative closed relationship. The downward movement of member 28 causes lower annular rim 28d of such member to enter glass charge 155 and provide a substantially hermetic seal between such lower rim and the glass while urging the glass surrounded by member 28 toward orifice 15 to the extent possible. Referring to FIG. 1, it is pointed out that the above discussed actuations and movements are caused by the downward actuation of rollers 76 and 77 and, thereby, yoke-shaped member 62 by the tracks or rails such as 151. Member 62, in turn, presses nut 63 and thereby, tubular member 41 downwardly in sleeve member 21 to compress spring 59. This permits compressed spring 38 to expand downwardly in bore 27a of sleeve member 27 and causes above-mentioned downward actuation of such sleeve member, and of sleeve member 28 and, thereby, of said fingers such as 79 and 81.

Figure 18:
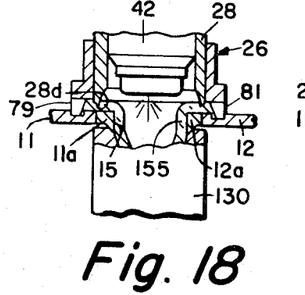
Figure 19:
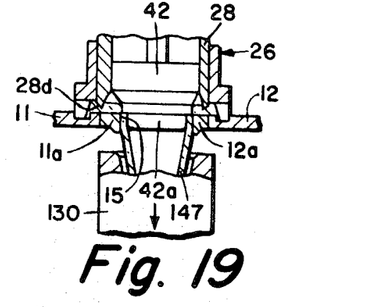

Movement of blow-head assembly 26 from position "D" to "E" (FIG. 13) causes top member 108 (FIG. 1) to be slightly depressed by blowbox 126 to cause a substantially hermetic seal between the bottom of the blowbox and the top of member 108 and, by compression of packing material 106 into tight contact with the outer periphery of tubular member 101, to cause a substantially hermetic seal between such outer periphery and the wall of member 108 defining the annular chamber 107 in such member. At position "E" (FIG. 13) and as illustrated in FIG. 18, compressed air is admitted from blowbox 126 to the entrance to previously mentioned passage 125 in member 108 of blow-head assembly 26 (FIG. 1) and such air flows out of the lower end of passage 125 (FIGS. 1 and 3) to expand glass charge 155 into contact and conformity with the inner surfaces of neck ring mold halves 11a and 12a, and with the wall of the cavity in parison mold 130 as shown in FIG. 19. If a detailed discussion of the manner in which compressed air may be supplied to said passage 125 from blowbox 126 is desired, reference may be made to the aforementioned patent to Woods et al. It is also pointed out that during the movement of assembly from position "D" to position "E," roller 113 (FIGS. 1 and 4) contacts the bottom surface of rail or track 114 as illustrated in FIG. 13, and a more positive hold-down for sleeve members 26 and 28 and, thereby, fingers 78, 79, 81 and 82 is provided.

Referring to position "F" in FIG. 13, and to FIG. 19 taken in conjunction with FIG. 1, as blow-head assembly 26 moves from position "E" to position "F," the tracks or rails such as 151 further actuate rollers 76 and 77, and their associated yoke-shaped member 62, downwardly and plunger head 42 is, thereby, also actuated downwardly into the interior of the neck portion of the otherwise formed parison 147. Simultaneously therewith, track 145 permits parison mold 130 to move downward from around the formed parison such as 147. Such actuation causes plunger head 42 to precisely form the inner periphery of said neck portion while the previously discussed annular channel 48 provided in the plunger head 42 (FIG. 2) precisely forms a seamless upper rim on parison 147. As previously mentioned, channel 46, annular space 49, and passages 51 and 52 in plunger head 42 provide an escape route for any air entrapped in said channel 48 during the forming of said seamless upper rim. It is also pointed out that the downward taper of the outer periphery of annular part 42c of plunger head 42, and of the annular rim portion 47 of such part 42c, provide below said seamless upper rim an annular "crack-off" region surrounding said neck portion of the formed parison such as 147. The glass in such annular "crack-off" region is pressed extremely thin during the forming of the inner periphery of the neck portion and said seamless upper rim of the parison such as 147 and, thereby, permits the formed parison to be subsequently readily separated in said region from the parent charge of molten glass.

Figure 20:
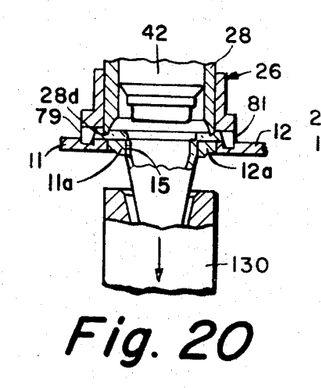
Figure 21:
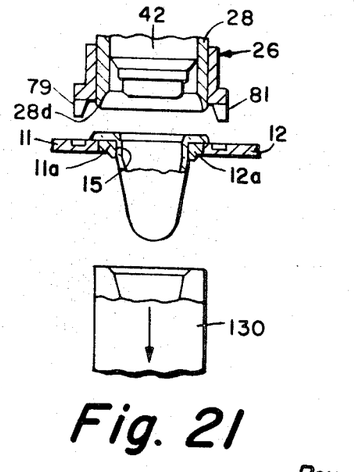

As assembly 26 moves from position "F" to positions "G" and then to "H" (FIG. 13) the tracks or rails such as 151 and 114 first permit plunger head 42 to be raised by initial expansion of spring 59 (FIG. 1) to the position shown in FIG. 20, and then permit both plunger head 42 and associated sleeve members 27 and 28 to be raised by the further expansion of spring 59 to their positions shown in FIG. 21. The movement of members 27 and 28 to position "H" again compresses spring 38 (FIG. 1). Blow-head assembly 26 is then back to its original position as in position "C" of FIG. 13. As blow-head assembly 26 moves from position "F" towards position "H" and beyond, as illustrated in FIG. 13, track 145 permits parison mold 130 to move progressively farther downward from around the formed parison such as 147. The neck ring mold assemblies then transport each formed parison in the direction indicated by the arrow in FIG. 13 and to finish molds such as shown in the aforesaid Woods et al. patent for final forming of articles such as containers from the preformed parisons.

From the foregoing discussion it will be recognized that the present invention comprises the forming of glass preforms or parisons by a blow and press process, such parisons being so formed from charges of molten glass disposed on the top surfaces of neck ring mold assemblies and over the orifices formed by the cooperative neck ring mold halves of such assemblies.

While the novel method and blow-head assembly herein disclosed has been discussed in conjunction with a machine such as that covered by the aforecited Woods et al. patent, such method and assembly, as previously mentioned, can be readily adapted to be employed on other types of machines such as, for example, a machine or apparatus such as disclosed in the previously cited U.S. Pat. No. 2,263,126 to David E. Gray et al. and in which individual gobs or charges of molten glass are each deposited on the top surface of an orifice plate in an overlying relationship with the orifice in such plate.

What is claimed is:

1. A method of forming a glass parison from a charge of molten glass deposited on the upper surfaces of a pair of cooperatively and horizontally disposed neck ring mold halves and their associated support assemblies in an overlying and surrounding relationship with the orifice embodied in such mold halves and extending vertically therethrough, such method comprising, A. disposing a parison mold against the lower surface of said neck ring mold halves with the center of the orifice defined by such mold halves in vertical alignment with the center of the glass-forming cavity embodied in such parison mold, B. pressing one end of a sleeve member downwardly into said glass charge with the passage through such sleeve member aligned with the center of said orifice and surrounding the portion of the glass charge overlying such orifice, C. supplying pressurized aeriform fluid to said passage in said sleeve member and thereby to said glass charge to blow part of the glass of such charge through said orifice defined by said neck ring mold halves and into conformity with the shape of such orifice and the shape of the cavity in said parison mold, D. withdrawing said parison mold from contact with the thus far formed glass parison, E. projecting a plunger head, including an annular rimforming channel thereon, through said passage in said sleeve member and into the inner periphery of the part of said glass charge formed by the orifice defined by said neck ring mold halves to form such inner periphery of such part of the glass charge into conformity with the outer periphery of said plunger while said annular channel simultaneously forms a seamless upper rim on the glass parison which is thus formed from the glass charge, and (F) further withdrawing said parison mold from about the lower part of the formed glass parison while simultaneously withdrawing said sleeve member and plunger head from the upper part of such parison to leave the parison suspended in said orifice defined by said neck ring mold halves for transfer of the parison to further glass-forming apparatus.

2. The method in accordance with claim 1 and in which said glass charge comprises a section of a ribbon of molten glass moving along a selected path of travel.

3. A method of preliminarily forming a molten glass charge into a parison in preparation for subsequently forming of such charge into a desired article, such method comprising, A. depositing said glass charge over an orifice embodied in a pair of cooperative and complemental neck ring mold halves and extending vertically therethrough, B. pressing one end of a sleeve member into the glass of said charge where the respective charge surrounds said orifice and so that the hollow in said sleeve member is disposed above said orifice, C. disposing a parison mold below said orifice with the center axis of the forming cavity of such mold in vertical alignment with the center axis of such orifice, D. supplying pressurized aeriform fluid through said hollow in said sleeve member to blow the glass of said charge to form a hollow parison having a neck portion whose outer surface conforms to the configuration of the walls defining said orifice and a body portion whose outer surface conforms to the configuration of the wall defining said cavity, E. withdrawing said parison mold from contact with the thus far formed glass parison while lowering a plunger head within said hollow in said sleeve member and into the glass in said orifice to press form an inner peripheral surface in said neck portion of said parison and a seamless upper rim on such neck portion, and F. completely removing said parison mold and said plunger head from said formed parison to permit transfer of the parison to apparatus for forming thereof into said desired article.

4. A method of forming the inner peripheral surface of the neck portion of a thin walled glass container and a seamless rim on the upper end of such neck portion, such method comprising, A. depositing a charge of molten glass on the top surfaces of a pair of separable and complemental neck ring mold halves which are in closed positions to define a circular glass forming orifice, and B. projecting a plunger head, including an annular rim forming channel thereon, into the inner periphery of the part of said glass charge formed by the orifice defined by said neck ring mold halves to form such inner periphery of such part of the glass charge into conformity with the outer periphery of said plunger head and to form simultaneously the upper part of said glass charge into conformity with said annular channel to provide a seamless upper rim on such upper part of the glass charge.

5. In the manufacture of a thin-walled glass container having substantially uniform glass distribution in the walls thereof, a method of forming a glass parison having uniform side wall portions and a threaded neck portion from a ribbon of molten glass which comprises, depositing a ribbon of molten glass upon a supporting surface having a threaded annular orifice extending therethrough, initially sagging said ribbon of glass through said orifice by gravity for a predetermined period of time to facilitate improved glass distribution, confining said sagged portion within an enclosure, blowing said sagged glass portion into contact with wall portions of said enclosure and said threaded annular orifice to form a parison, removing said closure from said parison, and press forming an upper portion of said parison to form the inner periphery of said neck portion of said parison and a seamless rim on such neck portion.

6. A method of forming a glass parison as defined in the claim 5 wherein an annular crack-off region, between an upper portion of said parison and said ribbon, is formed simultaneously with the press forming of said inner periphery of said neck portion of said parison.

* * * * *